Feb. 21, 1939.　　　R. RICHTER　　　2,147,990
HYDRAULIC AIR SPRING AND SHOCK ABSORBER
Filed Aug. 12, 1937　　2 Sheets-Sheet 2
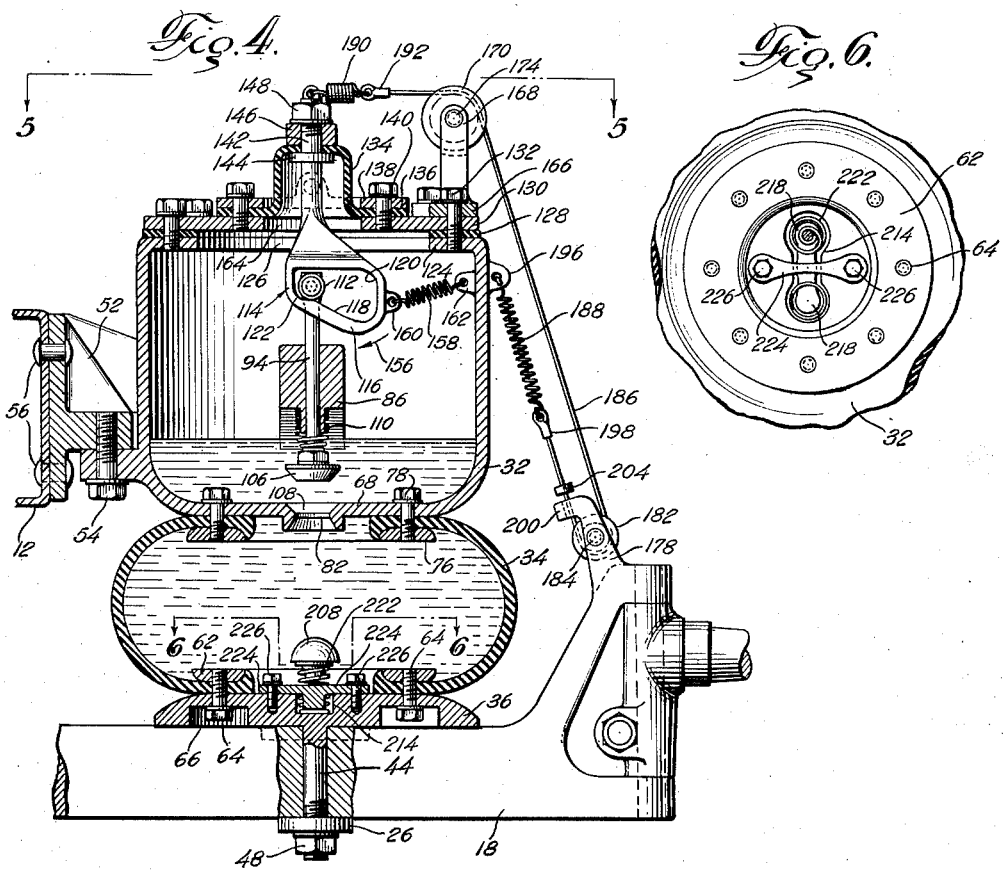
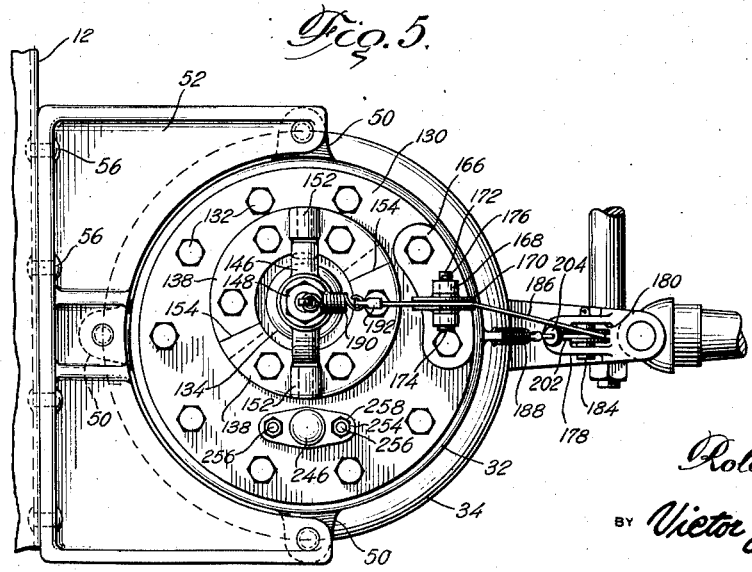
Roland Richter
INVENTOR
BY Victor J. Evans & Co.
HIS ATTORNEYS.

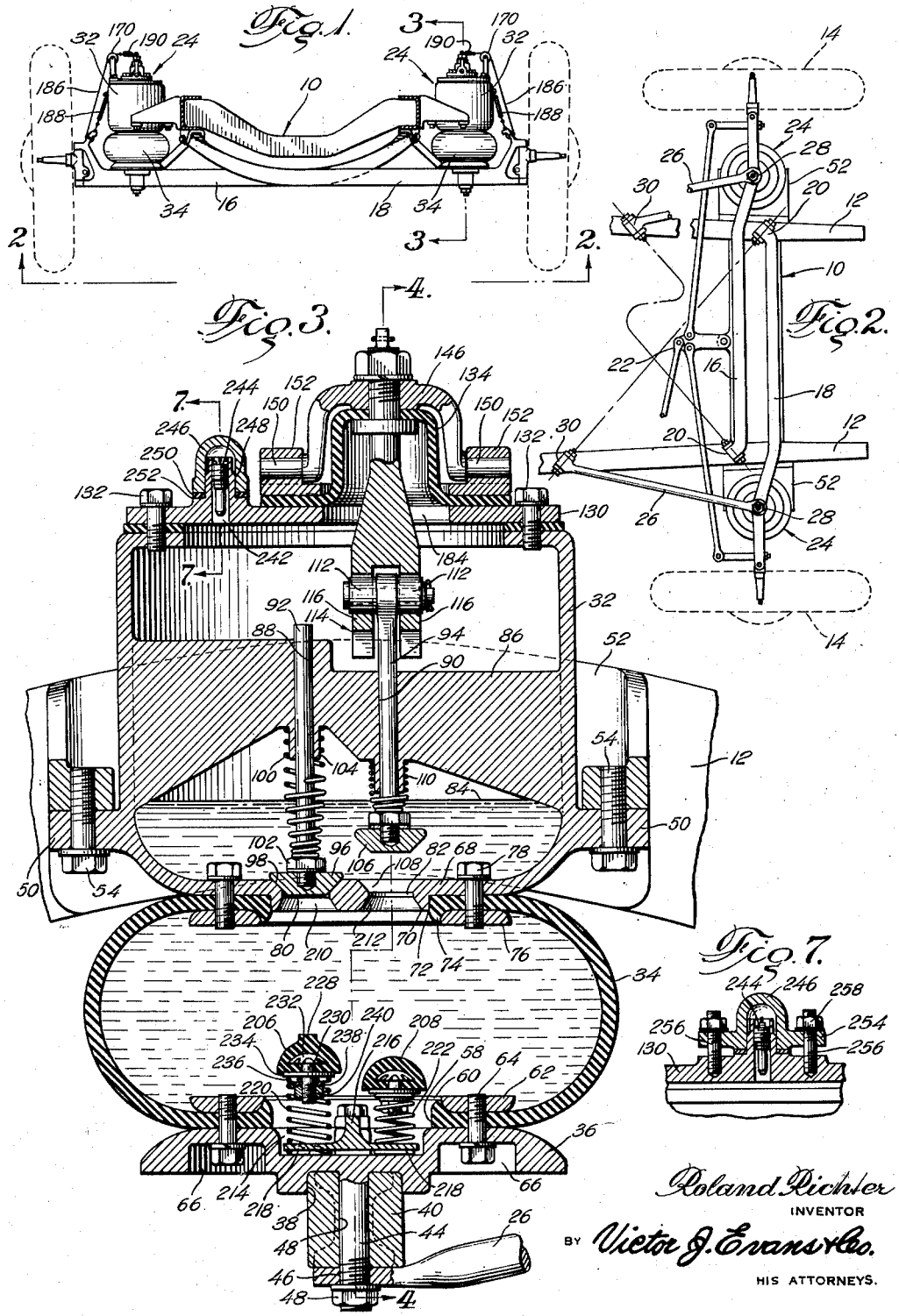

Patented Feb. 21, 1939

2,147,990

UNITED STATES PATENT OFFICE 2,147,990

HYDRAULIC-AIR SPRING AND SHOCK ABSORBER

Roland Richter, Albany, Minn.

Application August 12, 1937, Serial No. 158,784

8 Claims. (Cl. 267—64)

My invention relates to automotive vehicles and includes among its objects and advantages the provision of an improved hydraulic-air spring and shock absorber.

In the accompanying drawings:

Fig. 1 is an elevational view of a vehicle axle showing my invention applied thereto and the manner in which it is connected with the frame of the vehicle;

Fig. 2 is a top plan view of the structure of Fig. 1;

Fig. 3 is an enlarged sectional view along the line 3—3 of Fig. 1;

Fig. 4 is a sectional view along the line 4—4 of Fig. 3;

Fig. 5 is a top plan view of the structure of Fig. 4;

Fig. 6 is an enlarged view taken from the position indicated by line 6—6 of Fig. 4; and Fig. 7 is a sectional view along the line 7—7 of Fig. 3.

In the embodiment selected to illustrate my invention I make use of a vehicle chassis 10 including two frame members 12 of the type employed in automobiles and trucks. The front wheels 14 of the vehicle are connected with individual axles 16 and 18, each of which has its inner end pivotally connected at 20 with one of the frame members 12. The axes of the pivotal connections 20 are at angles of 45° to the longitudinal axis of the vehicle. The steering mechanism 22 is connected with the axle 16.

Chassis 10 is resiliently mounted on the axles 16 and 18 through the medium of cushioning units 24. These units are identical in construction, so that the description of one will apply to both. Brace rods 26 have their forward ends bolted to the axles 16 and 18 at 28 while their rear ends are pivotally connected at 30 with the frame members 12. The axes of the connections 30 are of the same angularity as the connections 20, with the connection 20 of one axle so related to its associated connection 30 as to permit free adjustment of the axle.

In Figs. 3 and 4, the cushioning unit 24 comprises a compression chamber 32 and a companion chamber 34 of a flexible nature and having communication with the chamber 32. Chamber 34 carries a base plate 36 recessed at 38 to partly receive the enlargement 40 formed on the axle 16. The enlargement 40 is bored at 42 for the reception of the bolt 44 formed integrally with the base plate 36. Bolt 44 passes through an opening 46 in the forward end of the brace rod 26, and the latter is held in assembled relation with the bolt and the enlargement 40 by a nut 48.

Compression chamber 32 is provided with three lugs 50 which are bolted to the bottom face of a bracket 52 by bolts 54. Bracket 52 is fixedly connected with one of the frame members 12 by rivets 56. Flexible chamber 34 accommodates pivotal movement of the axle 16.

I prefer to make the flexible chamber 34 of rubber suitably reinforced by fabric cords in the manner of tire casings. In Fig. 3, the casing 34 includes a large central opening 58 terminating in an upstanding flange 60. A ring 62 encircles the flange 60 and is of such width as to effectively press the margin of the chamber 34 against the upper face of the base plate. Bolts 64 pass through the base plate 36 and the adjacent margin of the chamber 34 and have threaded relation with the ring 62 for drawing it into pinching relation with the base plate 36. Recesses 66 may be formed in the bottom face of the base plate to accommodate the heads of the bolts 64 so as to provide a more compact arrangement.

Compression unit 32 includes a bottom 68 including a flange 70 which lies within the opening 72 in the upper wall of the chamber 34. This wall is flanged at 74, and a ring 76 encircles the flange and is arranged to draw the upper wall of the chamber 34 into pressure relation with the wall 68 by bolts 78. It will thus be seen that the flexible chamber 34 is mounted on the base plate 36 in such a manner as to provide a liquid and air tight relation, which is also true of the connection between the chambers 32 and 34. Wall 68 is provided with openings 80 and 82 which establish communication between the two chambers. Opening 82 is normally open. Chamber 34 is filled with liquid, with the level of the liquid rising in the chamber 32 up to about the level indicated by the line 84. Chamber 32 above its liquid level contains air under pressure. Therefore, each cushioning unit 24 is in the nature of a combination hydraulic and air spring for resiliently connecting the axles 16 and 18 with the frame of the vehicle.

Compression chamber 32 includes a bridge 86 located centrally of the chamber and bored at 88 and 90 for loosely receiving valve stems 92 and 94, respectively. Valve stem 92 carries a valve 96 which is urged into pressure relation with the valve seat 98 by compression spring 100 mounted on the stem with one end abutting the nut 102 adjacent the valve and its opposite end encircling the boss 104 having abutting relation with the bridge 86. Valve 96 is normally closed. Valve stem 94 carries a valve 106 arranged to have seating relation with the valve seat 108 under certain conditions, but the valve is normally opened, as illustrated in Fig. 3.

A compression spring 110 has pressure relation with the valve 106 and the bridge 86 to move the valve 106 to a closed position when the valve stem 94 is released. In Figs. 3 and 4, I illustrate the upper end of the valve stem as being provided with rollers 112 lying within a cam element 114. The cam element includes spaced flanges 116, each of which includes an angular cam surface 118, and the flanges are cut out at 120 to permit free movement of the rollers. Each cam surface 118 terminates in a depression 122 within which the rollers 112 lie in the normal position of the valve 106 for positively holding the valve in the position illustrated in Figs. 3 and 4.

The top wall 124 of the compression chamber 32 is provided with a large opening 126 for accommodating the cam member 114 as well as to lend access to the interior of the chamber. A sealing ring 128 is positioned on the exterior face of the wall 124 and is held in place by a closure plate 130 which is made secure by bolts 132 passing through openings in the closure plate 130, the sealing ring 128 and threaded into the wall 124. Upon the closure plate 130 I mount a flexible cup 134 having a flange 136 pinched between a ring 138, and the closure plate 130 by bolts 140. The bottom of the cup is provided with an opening for the reception of the shank 142 connected with the cam member 114. Shank 142 carries a flange 144 which bears against the bottom of the cup 134. Upon the shank 142 adjacent the outer face of the cup bottom I mount a yoke 146 and the bottom is pressed between the flange 144 and the yoke 146 by a nut 148 having threaded relation with the shank 142.

In Figs. 3 and 5, I illustrate the yoke 146 as being provided with trunnions 150 rotatably supported within bearings 152 cast integrally with the ring 138. This ring is split, as indicated at 154, to facilitate connection of the trunnions with the bearings. The axes of the trunnions 150 are located above but at right angles to the flanges 116. Cup 134 in being flexible permits the yoke to be pivoted about the axes of the trunnions 150 for swinging the cam member 114 in the direction of the arrow 156, at which time the rollers 112 are shifted out of restraining relation with the depressions 122. As the cam member 114 pivots in the direction of the arrow 156, the spring 110 will urge the valve 106 downwardly and into closing relation with the valve seat 108. Such movement of the cam member 114 is against the tension of a spring 158 which has one end connected with an eye 160 on the cam member 114, and its other end anchored to the lug 162 formed on the chamber 32. Cap 134 functions as a flexible seal for the opening 164 in the closure plate 130.

A bracket 166 is mounted on the closure plate 130 and is secured thereto by two of the bolts 132. This bracket includes spaced elements 168 between which a grooves wheel 170 is mounted. The wheel is rotatably mounted on a shaft 172 extending through aligned openings in the elements 168 and restrained from longitudinal shifting because of the head 174 and the pin 176.

Axle 18 is provided with an upstanding lug 178 bored at 180 for the reception of a grooves wheel 182 rotatably mounted on a shaft 184 carried by the lug 178. A wire 186 passes over the grooved wheels 170 and 182 with one end of the wire resiliently connected with the compression chamber 32 through the medium of a spring 188. The opposite end is resiliently connected with the outer end of the shank 142 by a spring 190. This end of the wire is provided with an eye 192 through which one end of the spring is hooked, while the opposite end of the spring is hooked through an eye 194 formed on the shank 142. Similarly, the compression chamber 32 is provided with an eye 196 through which one end of the spring 188 is hooked, while its opposite end is hooked through an eye 198 attached to the opposite end of the wire 186. Lug 178 includes a lateral extension or stop 200 grooved at 202 for accommodating the wire 186, while the wire adjacent the stop 200 is provided with a stop element 204.

Spring 188 is of sufficient tension to maintain the cable 186 taut while spring 190 yields only during extreme drops of the axle 18 or rebounds of the chassis 10. Spring 158 is of sufficient tension to overcome the influence of spring 110 as well as the pressure of the liquid above the valve when in a closed position. Upon rebound movement of the chassis or a downward thrust of the axle 18, the stop element 204 engages the stop 200, after which increased pull on the cable 186 causes the cam member 114 to be pivoted in the direction of the arrow 156 against the tension of the spring 158, at which time the valve 106 is moved into seating relation with the valve seat 108.

Upon the base plate 36 I mount two valves 206 and 208 which are aligned with the openings 80 and 82, respectively. Valve 206 is arranged to have seating relation with the valve seat 210 under certain conditions, while the valve 208 may at times have seating relation with the valve seat 212. Both valves 206 and 208 are resiliently mounted. In the upper face of the base plate 36 I provide a depression 214 for housing a retainer 216 having flat reaches 218 passed through the lower convolutions of coil springs 220 and 222 associated with the valves 206 and 208, respectively. The retainer includes reaches 224 formed integrally therewith and arranged at right angles to the flat reaches 218. The reaches 224 are provided with openings for the reception of bolts 226 having threaded relation with the base plate 36 for clamping the lower convolutions of the springs 220 and 222 against the bottom of the depression for fixedly mounting the springs.

Valves 206 and 208 are of resilient material, such as rubber. Both valves are of identical construction with the exception that the valve 206 includes an elevation 228 arranged to engage the valve 96 for holding it off its seat when the valve 206 is brought into closing relation with the valve seat 210. In Fig. 3, I illustrate the manner in which valve 206 is connected with the spring 210, but the valve 208 is connected with its spring in the same manner. Valve 206 carries a shaft 230 having a head 232 imbedded in the material of the valve. A flange 234 is formed integrally with the shaft 230 and constitutes a seat for the valve 206. The upper end of the spring 220 is shaped to provide a loop 236 which closely embraces the shaft 230. A washer 238 is mounted on the shaft 230 adjacent the loop 236, and the shaft is threaded for the reception of a nut 240 which, when tightened, firmly pinches the loop 236 between the washer 238 and the flange 234. Valve 206 is positioned slightly higher than valve 208.

Closure plate 130 is provided with an opening 242 within which I mount a valve 244 of the same type as conventional tire valves used for tire inflating purposes. Valve 244 has threaded relation with the bore 242 and is normally enclosed by a cap 246. This cap fits snugly about the boss 248 formed integrally with the closure plate 130, and the cap has pressure relation with a sealing gasket 250 lying on the shoulder 252 surrounding the boss 248. Two lateral extensions 254 are formed integrally with the cap 246 and are provided with openings for the reception of stud bolts 256 having threaded relation with the closure plate 130. The cap 246 is held in pressure relation with the sealing gasket 250 by nuts 258 having threaded engagement with the outer ends of the stud bolts 256. The compression chamber 32 may be supplied with compressed air through the medium of the valve 244 by merely removing the cap 246.

From the foregoing description of the various parts of the device, the operation thereof will be readily understood. Normally, valve 106 remains open so that the opening 82 constitutes a by-pass for the liquid which fills the flexible chamber 34 and partly fills the compression chamber 32. Compression chamber 32 is filled with air under the necessary pressure so that the movement of liquid through the openings 82 is against the pressure of the air in the chamber 32 on an upward excursion of the axle 18 or on a downward thrust of the vehicle chassis. However, the compressed air provides a resilient cushion for the vehicle chassis.

On an excessive downward thrust of the axle, the spring 188 will yield, but the stop element 204 is brought into engagement with the stop 200, after which a further pull on the wire 186 pivots the shank 142 about the axes of the trunnions 150 for swinging the cam element 114 in the direction of the arrow 156. Such movement of the cam element releases the valve 106, whereupon the spring 110 urges the valve to the closed position. With the valve 106 closed, liquid in the compression chamber 32 is prevented from entering the chamber 34, which condition tends to resist a further excursion of the axle. The same action takes place during an excessive rebound of the chassis. Immediately upon slack in the wire 186, the spring 158 returns the valve 106 to the position of Fig. 4 through counter-rotation of the cam element 114. Spring 188 is of sufficient length to take up the slack in the wire 186 in all positions of adjustment. Spring 190 provides additional extension for the wire 186 under extreme shifts of the parts to prevent breaking of the wire.

In an extreme upward shift of the axle or a downward thrust of the chassis, compression of the chamber 34 forces liquid into the chamber 32 against the air pressure therein, but if the shifting of the parts is of such degree and rapidity as to place the liquid in the chamber 34 under considerable pressure, valve 96 may open and cooperate with the opening 82 for by-passing liquid into the compression chamber 32. Thus, the uncovered opening 80 cooperates with the opening 82 to perform a shock absorber function. Upon extreme shifting of the parts, the valve 206 is first brought into seating relation with the seat 210, after which further shifting brings the valve 208 into seating relation with the valve seat 212 to prevent further by-passing of liquid, thus limiting further shifting. Valves 206 and 208 are resiliently mounted so as to prevent damage thereto when suddenly moved into closing relation with their respective valve seats. Openings 80 and 82 are closed before the chamber 32 is completely collapsed so as to prevent direct contact between the rings 62 and 76. Elevation 228 on the valve 206 unseats the valve 96 when the valve 206 is in seating relation with the valve seat 210 so as to prevent the creation of a vacuum which might prevent the valves 206 and 208 from unseating. Valve 206 closes first and thus eases the action before valve 208 is moved to a closing position.

The invention is applicable to all types of vehicles and may easily be adapted thereto by merely varying the air pressure depending upon the operating conditions. The resilient mounting embodies a shock absorber. The unit is of simple construction and will wear indefinitely. If the load is carried at the upper limit of extension, side sway of the vehicle body is greatly reduced, as when rounding a corner at a high speed.

Without further elaboration, the foregoing will so fully explain my invention that others may, by applying current knowledge, readily adapt the same for use under various conditions of service.

I claim:

1. The combination with a vehicle chassis, of a supporting wheel for the same, a cushioning unit connecting the chassis with the wheel, said cushioning unit comprising a flexible chamber and a compressed air chamber, said chambers having communication, a liquid in said flexible chamber, and means co-operable on the compressed air chamber and said wheel for cutting off communication between the two chambers when either the chassis or the wheel moves a predetermined distance away from the other.

2. The combination with a vehicle chassis, of a supporting wheel for the same, a cushioning unit connecting the chassis with the wheel, said cushioning unit comprising a flexible chamber and a compressed air chamber, said chambers having communication, a liquid in said flexible chamber, and means for cutting off communication between the chambers after a predetermined travel of either the chassis or the wheel in the direction of the other, said means comprising a port between the chambers and a valve for closing the port, said valve being resiliently mounted.

3. The combination with a vehicle chassis, of a supporting wheel for the same, a cushioning unit connecting the chassis with the wheel, said cushioning unit comprising a flexible chamber and a compressed air chamber, said chambers having communication, a liquid in said flexible chamber, and means for cutting off communication between the chambers after a predetermined travel of either the chassis or the wheel in the direction of the other, said means comprising ports and a plurality of valves for closing said ports, said valves being resiliently mounted.

4. The combination of a vehicle chassis, an axle pivotally connected with the chassis, a supporting wheel carried by the axle, a load supporting cushioning unit connecting the axle with the chassis, said load supporting cushioning unit comprising communicating chambers, one of said chambers being flexible, liquid in said flexible chamber and partly filling the other chamber, the said other chamber containing air under pressure, the communication between the chambers constituting a by-pass for the liquid during normal excursions of the chassis or the axle one from the other, and valve means for cutting off communication between the chambers during excessive excursions of the chassis or the axle one from the other.

5. The combination of a vehicle chassis, an axle pivotally connected with the chassis, a supporting wheel carried by the axle, a load supporting cushioning unit connecting the axle with the chassis, said load supporting cushioning unit comprising communicating chambers, one of said chambers being flexible, liquid in said flexible chamber and partly filling the other chamber, the said other chamber containing air under pressure, the communication between the chambers constituting a by-pass for the liquid during normal excursions of the chassis or the axle one from the other, valve means for cutting off communication between the chambers during excessive excursions of the chassis or the axle one from the other, and an air chamber carried by the said other chamber.

6. The combination with a vehicle chassis, of a supporting wheel for the same, a cushioning unit connecting the chassis with the wheel, said cushioning unit comprising a flexible chamber and a compressed air chamber, said chambers having communication, a liquid in said flexible chamber, means cooperable on the compressed air chamber and said wheel for cutting off communication between the two chambers when either the chassis or the wheel moves a predetermined distance away from the other, and means for cutting off communication between the two chambers when either the chassis or the wheel moves a predetermined distance in the direction of the other.

7. The combination of a vehicle chassis, an axle pivotally connected with the chassis, a supporting wheel carried by the axle, a load supporting cushioning unit connecting the axle with the chassis, said load supporting cushioning unit comprising communicating chambers, one of said chambers being flexible, liquid in said flexible chamber and partly filling the other chamber, the said other chamber containing air under pressure, the communication between the chambers constituting a by-pass for the liquid during normal excursions of the chassis or the axle one from the other, valve means for cutting off communication between the chambers during excessive excursions of the chassis or the axle one from the other, and means for cutting off communication between the chambers during excessive excursions of the chassis or the axle in the direction of the other.

8. The combination with a vehicle chassis, of a supporting wheel for the same, a load carrying unit connecting the chassis with the wheel, said load carrying unit comprising a flexible chamber and a compressed air chamber, said chambers having communication, a liquid in said flexible chamber, means cooperable on the compressed air chamber and said wheel for cutting off communication between the two chambers when either the chassis or the wheel moves a predetermined distance away from the other, pressure responsive means for increasing the degree of communication between the two chambers upon predetermined travel of either the chassis or the wheel in the direction of the other, and means for cutting off communication between the chambers upon further movement of the chassis or the wheel in the direction of the other.

ROLAND RICHTER.